(12) United States Patent
Petersen et al.

(10) Patent No.: US 8,806,268 B2
(45) Date of Patent: Aug. 12, 2014

(54) COMMUNICATION OF CONDITIONS AT A PRIMARY STORAGE CONTROLLER TO A HOST

(75) Inventors: David B. Petersen, Virginia Falls, VA (US); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/249,000

(22) Filed: Sep. 29, 2011

(65) Prior Publication Data

US 2013/0086415 A1   Apr. 4, 2013

(51) Int. Cl.
*G06F 11/00* (2006.01)
*G06F 11/20* (2006.01)

(52) U.S. Cl.
CPC ........ *G06F 11/2069* (2013.01); *G06F 11/2071* (2013.01)
USPC ............................... 714/6.3; 714/6.1; 714/6.2

(58) Field of Classification Search
CPC ............ G06F 11/2069; G06F 11/2071; G06F 11/2064
USPC ......................................... 714/6.3, 6.23, 6.22
See application file for complete search history.

(56) References Cited

U.S. PATENT DOCUMENTS

| | | | | |
|---|---|---|---|---|
| 6,732,289 B1 * | 5/2004 | Talagala et al. | | 714/6.3 |
| 6,732,298 B1 * | 5/2004 | Murthy et al. | | 714/34 |
| 7,085,956 B2 | 8/2006 | Petersen et al. | | |
| 7,512,835 B2 | 3/2009 | Bartfai et al. | | |
| 7,627,729 B2 | 12/2009 | Bartfai et al. | | |
| 7,647,463 B2 | 1/2010 | Jarvis et al. | | |
| 7,680,994 B2 | 3/2010 | Buah et al. | | |
| 7,716,437 B2 | 5/2010 | Coronado et al. | | |
| 7,743,138 B2 | 6/2010 | Gallant et al. | | |
| 7,992,031 B2 | 8/2011 | Chavda et al. | | |
| 2005/0044451 A1 * | 2/2005 | Fry et al. | | 714/38 |
| 2005/0229021 A1 * | 10/2005 | Lubbers et al. | | 714/2 |
| 2008/0126857 A1 * | 5/2008 | Basham et al. | | 714/25 |
| 2009/0164837 A1 * | 6/2009 | Swanson et al. | | 714/6 |
| 2009/0313428 A1 | 12/2009 | De Jong | | |
| 2011/0099360 A1 | 4/2011 | Bashir et al. | | |

OTHER PUBLICATIONS

B. Kern, "IBM HyperSwap Options", IBM Corporation, Apr. 2010, pp. 1-36.
"GDPS/PPRC Split Freeze Policy", IP.com, Dec. 14, 2010, IP.com No. IPCOM000202381D, pp. 1-7.

* cited by examiner

*Primary Examiner* — Sarai Butler
(74) *Attorney, Agent, or Firm* — Rabindranath Dutta; Konrad Raynes Davda & Victor, LLP

(57) ABSTRACT

A primary storage controller is maintained in a copy relationship with a secondary storage controller, wherein the primary and secondary storage controllers are coupled to a host that is configurable to use the secondary storage controller instead of the primary storage controller. The primary storage controller determines occurrence of at least one condition in the primary storage controller, wherein the at least one condition occurs prior to a failure of the host to perform an Input/Output (I/O) operation with respect to at least one storage volume of the primary storage controller. The primary storage controller communicates the occurrence of the at least one condition to the host, wherein in response to the communicating the host is configured to determine whether to use the secondary storage controller instead of the primary storage controller based on the occurrence of the at least one condition.

20 Claims, 5 Drawing Sheets

COMMUNICATION OF CONDITIONS AT A PRIMARY STORAGE CONTROLLER TO A HOST

BACKGROUND

1. Field

The disclosure relates to a method, system, and article of manufacture for the communication of conditions at a primary storage controller to a host.

2. Background

A host may be coupled to a primary storage controller and a secondary storage controller. Storage volumes in the primary storage controller may be copied via synchronous peer to peer remote copy operations to the secondary storage controller. The primary and secondary storage controllers may in such a situation be referred to as being in a mirrored configuration.

The host may issue write requests to the primary storage controller, and the primary storage controller may replicate the writes to the secondary storage controller; the secondary storage controller may acknowledge the writes to the primary storage controller, and the primary storage controller may then acknowledge the writes to the host.

In certain situations, the host may not be able to perform I/O operations with one or more storage volumes of the primary storage controller. The inability to perform I/O operations with one or more storage volumes of the primary storage controller may be because of the failure of the one or more storage volumes in the primary storage controller, or because of the failure of the primary storage controller itself. In such situations, the host may be able to substitute usage of the primary storage controller with the secondary storage controller (i.e., use the secondary storage controller instead of primary storage controller), such that host applications may continue to execute.

If a host application was previously accessing the primary storage controller and received indications of I/O failures, then swapping of the primary storage controller by the secondary storage controller that maintains copies of the storage volumes of the primary storage controller allows the host application to continue execution. From the host application perspective, the swapping is transparent, i.e., host applications do not have to be aware that a swapping took place.

SUMMARY OF THE PREFERRED EMBODIMENTS

Provided are a method, a system, a computer program product, in which a primary storage controller is maintained in a copy relationship with a secondary storage controller, wherein the primary and secondary storage controllers are coupled to a host that is configurable to use the secondary storage controller instead of the primary storage controller. The primary storage controller determines occurrence of at least one condition in the primary storage controller, wherein the at least one condition occurs prior to a failure of the host to perform an Input/Output (I/O) operation with respect to at least one storage volume of the primary storage controller. The primary storage controller communicates the occurrence of the at least one condition to the host, wherein in response to the communicating the host is configured to determine whether to use the secondary storage controller instead of the primary storage controller based on the occurrence of the at least one condition.

In certain embodiments, the occurrence of the at least one condition is caused by a loss of storage redundancy in the primary storage controller.

In further embodiments, the occurrence of the at least one condition is caused by a performance degradation in the primary storage controller.

In yet further embodiments, the occurrence of the at least one condition is caused by errors exceeding a threshold in the primary storage controller.

In additional embodiments, the occurrence of the at least one condition is caused by an acute error in the primary storage controller from which recovery is not possible in the primary storage controller.

In yet additional embodiments, the copy relationship is a synchronous peer to peer remote copy relationship. The primary storage controller is not configured to substitute usage of the primary storage controller with usage of the secondary storage controller, and the determining of the occurrence of the at least one condition and the communicating of the occurrence of the at least one condition to the host, are performed in response to the primary storage controller determining that the host has capability to substitute usage of the primary storage controller with usage of the secondary storage controller, wherein the communicating provides an indication that requests a remedial action to an operator.

In further embodiments, in response to a determination that a freeze has to be performed during synchronous peer to peer remote copy operations or to use the secondary storage controller instead of the primary storage controller, a grouping is performed at predetermined intervals of time of a plurality of interrupts into a single interrupt to reduce a total number of interrupts.

In still further embodiments, the primary storage controller receives a request from the host for additional information regarding the occurrence of at least one condition, in response to the communicating, by the primary storage controller, of the occurrence of the at least one condition to the host. The primary storage controller sends the requested additional information, to the host, wherein in response to the host receiving the additional information, the host determines whether to use the secondary storage controller instead of the primary storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Communications and Recovery in Storage Systems

Storage controllers are designed for continuous availability. However, there are some recovery scenarios that may take several seconds and that may impact host I/O. If the storage controller is not in a mirrored configuration with host software that is configurable to swap to an alternate storage controller, then it is appropriate for the storage controller to do all it can to recover from errors, even if the recovery period is long and impacts production.

However, if the storage controller is in a mirrored configuration with host software that is configurable to swap to an alternate storage controller, then it may improve availability if a swap to the alternate storage controller were to occur instead of continuing to try and recover from the failing storage controller. In addition, the quicker the swap can occur, the higher the availability of the storage system.

Certain embodiments allow a primary storage controller in a mirrored configuration with a secondary storage controller, when supported via a host having capabilities to swap storage controllers, to send communications to the host of any recovery processing that will impact host I/Os for an extended period. In such a situation, the host may initiate swapping of the primary storage controller with the secondary storage controller. This may allow the former primary storage controller to complete its recovery while allowing host I/Os to proceed by using the former secondary storage controller.

In certain embodiments the primary storage controller presents existing notifications of remote copy suspension events in a more consolidated form by grouping multiple interrupts into a single interrupt.

Certain embodiments may reduce the overhead of lengthy error recovery, improve scalability, and cause faster freezing and swapping of storage controllers.

Exemplary Embodiments

Figure 1:
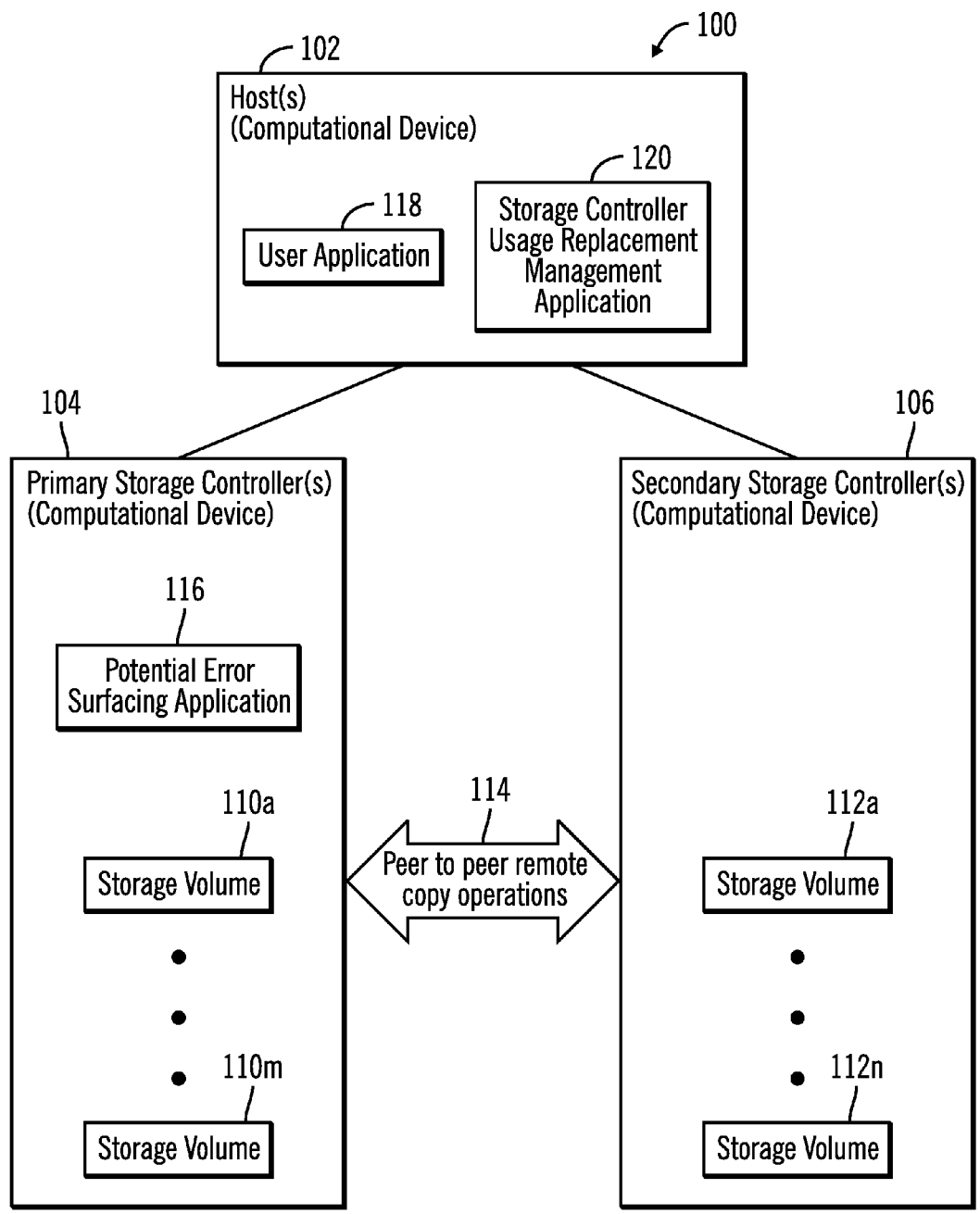
FIG. 1 illustrates a block diagram of a computing environment that includes one or more hosts coupled to at least one primary storage controller and at least one secondary storage controller that are in a synchronous copy relationship, in accordance with certain embodiments.

FIG. 1 illustrates a block diagram of a computing environment 100 that includes one or more hosts 102 coupled to at least one primary storage controller 104 and at least one secondary storage controller 106 that are in a synchronous copy relationship, in accordance with certain embodiments.

The primary storage controller 104, the secondary storage controller 106, and the host 102 may comprise any suitable computational device including those presently known in the art, such as, a personal computer, a workstation, a server, a mainframe, a hand held computer, a palm top computer, a telephony device, a network appliance, a blade computer, a server, etc.

The primary storage controller 104 and secondary storage controller 106 may each include or be coupled to groupings of any suitable storage devices, such as, hard disks, solid state disks, linear storage devices, etc. In certain embodiments, the physical storage present in storage devices controlled via the primary storage controller 104 and the secondary storage controller 106 may be logically addressed as storage volumes 110a . . . 110m, 112a . . . 112n as shown in FIG. 1.

The primary storage controller 104, the secondary storage controller 106, and the host 102 may communicate over a network (not shown), where the network may comprise any suitable network, such as, the Internet, a storage area network, a wide area network, a local area network, etc. In certain embodiments, the primary storage controller 104, the secondary storage controller 106, and the host 102 may be implemented in a cloud computing environment and may provide processing and storage services to users.

The primary storage controller 104 may allow the performing of peer to peer remote copy operations 114 between the primary storage controller 104 and the secondary storage controller 106. In certain embodiments, the primary storage controller 104 and the secondary storage controller 106 may be separated by distances of over ten kilometers or more. For example, in certain embodiments the primary storage controller 104 and the secondary storage controller 106 may be separated by distances of over hundred kilometers. In certain embodiments, the peer to peer remote copy operations 114 may be performed synchronously to ensure that the same data is maintained in the primary storage controller 104 and the secondary storage controller 106.

The primary storage controller 104 includes a potential error surfacing application 116 that can send communications to the host 102 indicating that certain conditions have occurred in the primary storage controller 104 that may potentially result in a failure or a reduced performance at a future point in time. At the time the potential error surfacing application 116 sends the communications to the host 102, the user application 118 on the host 102 can still perform I/O or is waiting to perform I/O with respect to the storage volumes 110a . . . 110m of the primary storage controller 104.

The host 102 includes a storage controller usage replacement management application 120 that is capable of swapping the primary storage controller 104 with the secondary storage controller 106. Since the storage controller usage replacement management application 120 is capable of replacing usage of the primary storage controller 104 with the secondary storage controller 106, it is preferable to perform the replacement in usage, in case the primary storage controller 104 indicates to the host 102 that the performance has been impacted considerably, or that potential failures are likely, or that error recovery is anticipated to take a considerable period of time. The above is not an exhaustive list of conditions under which the storage controller usage replacement management application 120 swaps the primary storage controller 104 for the secondary storage controller 106, wherein swapping or replacing usage of the primary storage controller 104 for the secondary storage controller 106 means that the secondary storage controller 106 is used instead of the primary storage controller 104. It should be noted that there is no physical replacement of the primary storage controller 104 with the secondary storage controller 106.

Therefore, FIG. 1 shows certain embodiments in which in response to certain indications that provide a warning or a possibility of potential error from the primary storage controller 104 to the host 102, the host 102 may swap the primary storage controller 104 for the secondary storage controller 106. As a result, the performance of user application 118 is not impaired by a failure of I/O operations to a defective primary storage controller. While in FIG. 1, one primary storage controller is shown in a copy relationship with one secondary storage controller, in alternative embodiments other pairs of primary and secondary storage controllers in a copy relationship may also be maintained within the computing environment 100.

Figure 2:
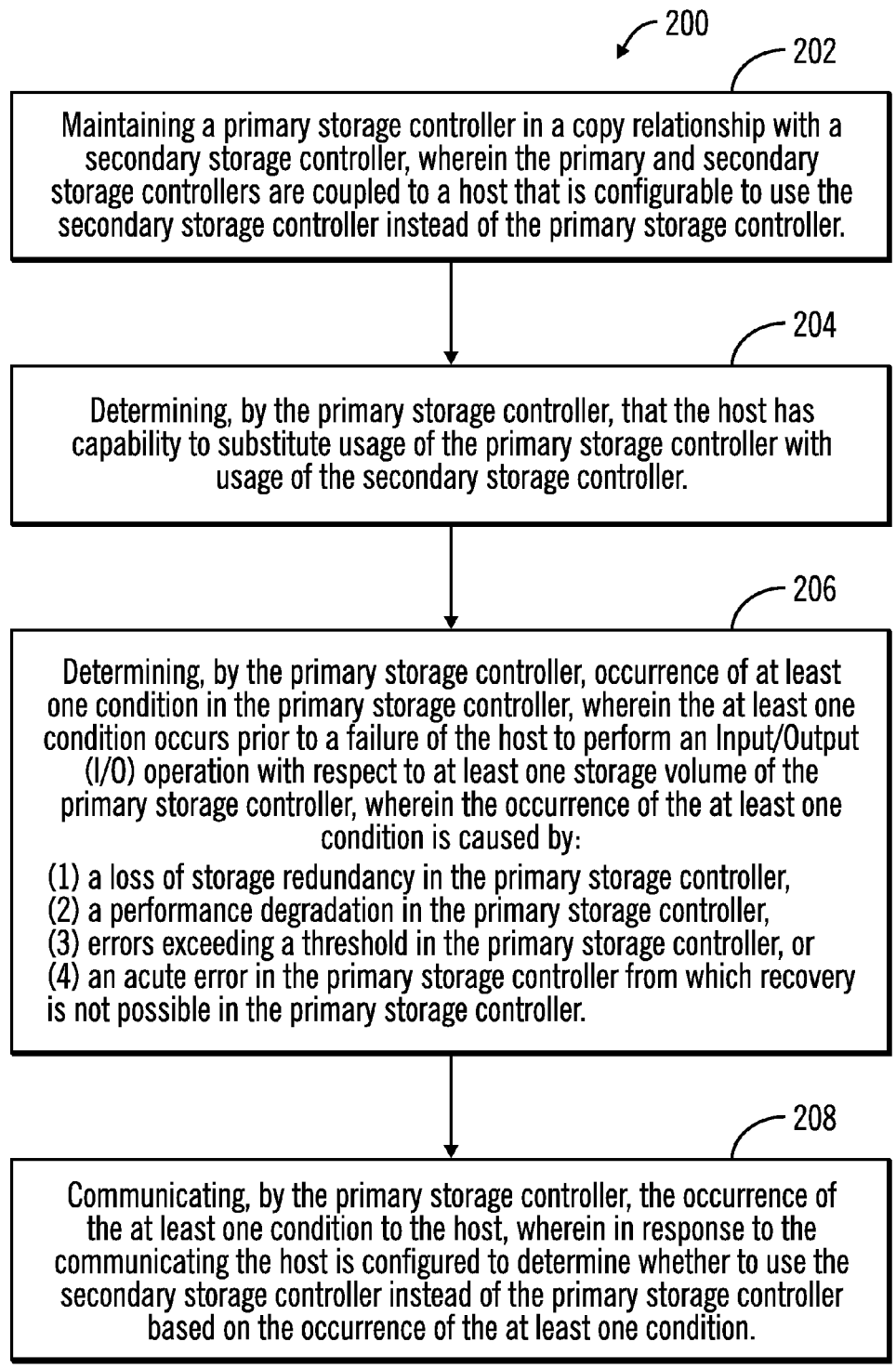
FIG. 2 illustrates a first flowchart that shows at least how the primary storage controller communicates the occurrence of at least one condition in the primary storage controller to the host, in accordance with certain embodiments.

FIG. 2 illustrates a first flowchart 200 that shows at least how the primary storage controller 104 communicates the occurrence of at least one condition in the primary storage controller 104 to the host 102, in accordance with certain embodiments. The operations shown in FIG. 2 may be implemented at least by the potential error surfacing application 116 that executes in the primary storage controller 104.

Control starts at block 202, in which a primary storage controller 104 is maintained in a copy relationship with a secondary storage controller 106, wherein the primary storage controller 104 and the secondary storage controller 106 are coupled to a host 102 that is configurable to use the secondary storage controller 106 instead of the primary storage controller 104 via a storage controller usage replacement management application 120.

The primary storage controller 104 determines (at block 204) that the host 102 has capability to substitute usage of the primary storage controller 104 with usage of the secondary storage controller 106. Then the primary storage controller 104 determines (at block 206) occurrence of at least one condition in the primary storage controller 104, wherein the at least one condition occurs prior to a failure of the host 102 to perform an Input/Output (I/O) operation with respect to at least one storage volume of the primary storage controller 104, wherein the occurrence of the at least one condition is caused by:

(1) A loss of storage redundancy in the primary storage controller (e.g., via a failure of a Redundant Array of Independent Disk (RAID) in a RAID configuration on the primary storage controller 104, where there is no likelihood of I/O error as a result of the failure of the disk because of the redundancy of RAID);

(2) a performance degradation in the primary storage controller (e.g., performance has fallen below a predetermined or preconfigured level of performance);

(3) errors exceeding a threshold in the primary storage controller; or (4) an acute error in the primary storage controller from which recovery is not possible in the primary storage controller.

From block 206, control proceeds to block 208 in which the primary storage controller 104 communicates the occurrence of the at least one condition to the host 102, wherein in response to the communicating the host 102 is configured to determine whether to use the secondary storage controller 106 instead of the primary storage controller 104 based on the occurrence of the at least one condition. In certain situations, the host 102 may find it preferable not to replace usage of the primary storage controller 104 with usage of the secondary storage controller 106.

Therefore, FIG. 2 illustrates certain embodiments in which the primary storage controller 104 sends communications on the occurrence of certain conditions to the host 102, and the host 102 may then analyze the conditions after optionally seeking additional information to determine whether or not to use the secondary storage controller 106 instead of the primary storage controller 104.

Figure 3:
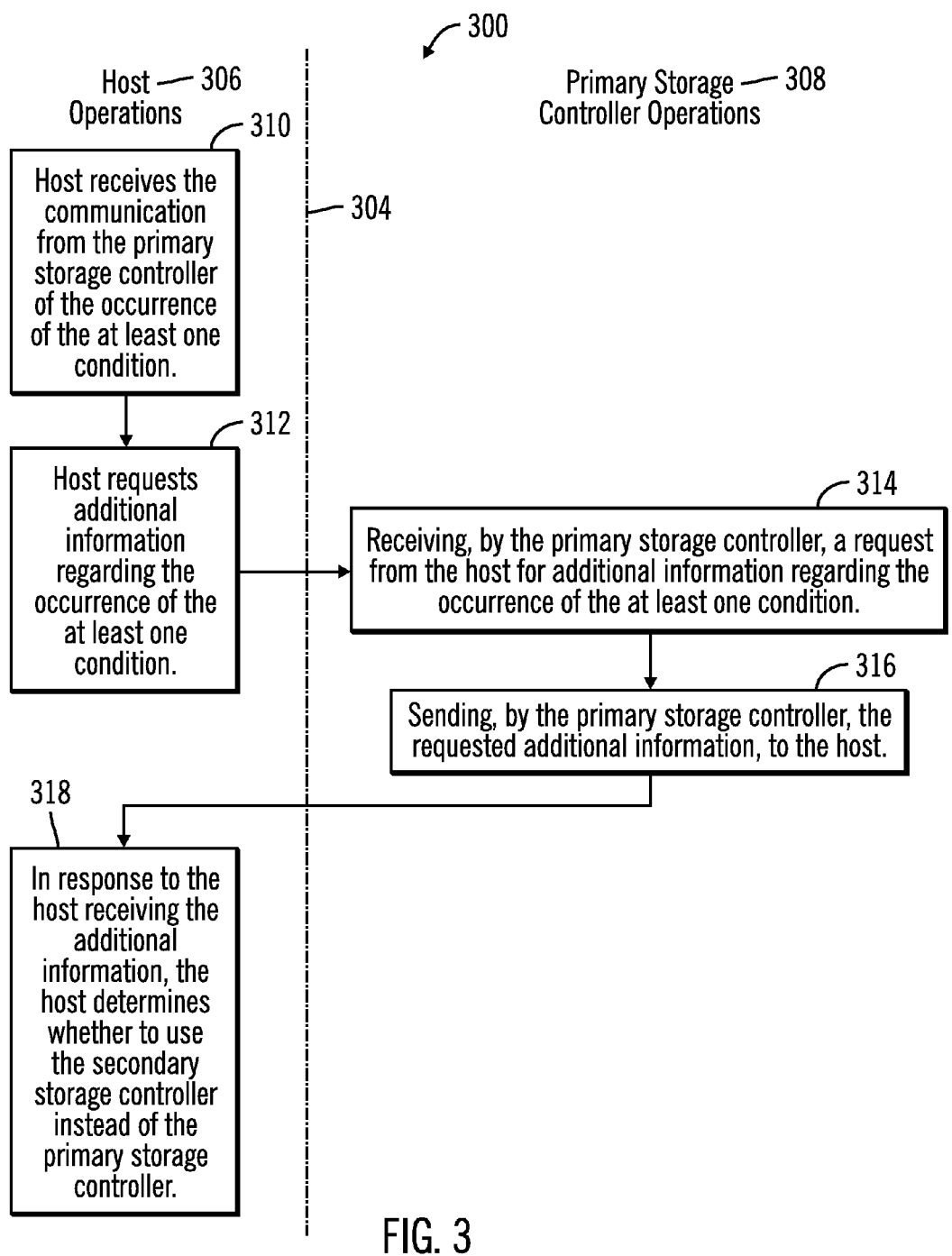
FIG. 3 illustrates a second flowchart that shows operations performed by the host and the primary storage controller, in accordance with certain embodiments.

FIG. 3 illustrates a second flowchart 300 that shows operations performed by the host 102 and the primary storage controller 104, in accordance with certain embodiments. The host operations 306 are shown to the left of the dashed line 304 and the primary storage controller operations 308 are shown to the right of the line 304.

Control starts at block 310, in which the host 102 receives communication from the primary storage controller 104 of the occurrence of the at least one condition. It may be noted that the sending of communication from the primary storage controller 104 to the host 102 was shown in block 208 of FIG. 2.

In certain embodiments, the host 102 may request (at block 312) additional information from the primary storage controller 104 regarding the occurrence of the at least one condition. The additional information requested may be different for different conditions.

The primary storage controller 104 receives (at block 314) the request from the host 102 for additional information regarding the occurrence of the at least one condition. The primary storage controller 104 sends (at block 316) the requested additional information, to the host 102. The additional information may provide detailed status of various flags, registers, state of certain variables, etc.

Control proceeds to block 318, in which the host 102, in response to receiving the additional information, determines whether to use the secondary storage controller 106 instead of the primary storage controller 104. The determination of whether to replace the usage of the primary storage controller 104 with the usage of the secondary storage controller 106 may be based on an assessment of the storage controller usage replacement management application 120 on which option is likely to improve system performance and provide faster responses to the user application 118.

Figure 4:
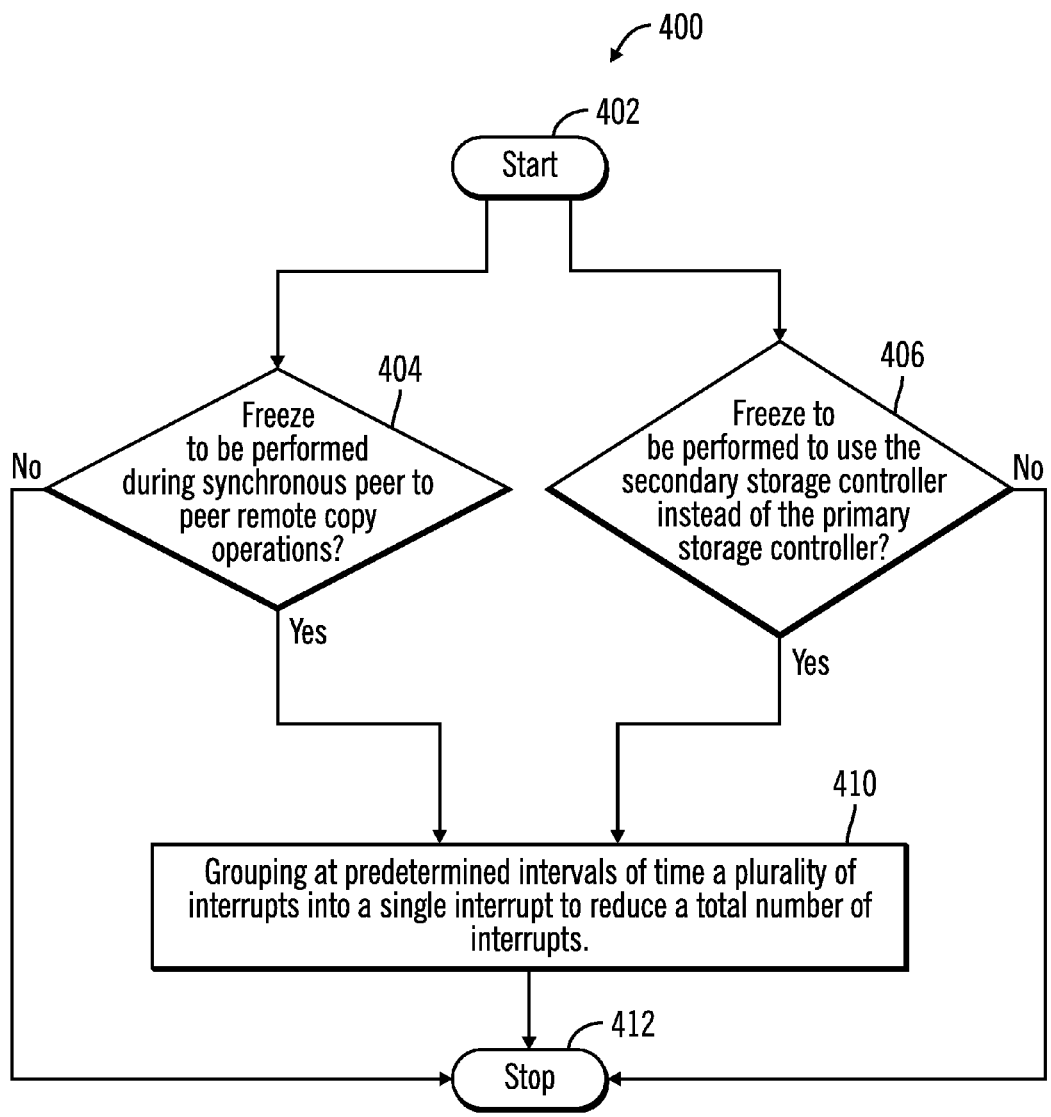
FIG. 4 illustrates a third flowchart that shows grouping of interrupts at predetermined intervals of time, in accordance with certain embodiments.

FIG. 4 illustrates a third flowchart 400 that shows grouping of interrupts at predetermined intervals of time, in accordance with certain embodiments.

In certain embodiments, there may be numerous (e.g., over a thousand) storage volume pairs in a copy relationship between the primary storage controller 104 and the secondary storage controller 106. The overhead of managing the environment on a volume by volume (or volume pair by volume pair) basis may be prohibitive, in terms of system resources and performance. Certain embodiments may manage the environment in a more efficient manner by grouping multiple interrupts generated by the freezing of a large number of storage volumes, by grouping multiple interrupts into a single interrupt at predetermined intervals of time, as shown in FIG. 4.

A freeze (i.e., a quiescence), of a storage volume is a state in which no I/O operations are allowed to be performed on the storage volume. When a volume is frozen an interrupt is to be generated. However, with a large number of volumes that may need to be frozen the interrupts may overwhelm the processing capabilities of the system or there may be a significant amount of system overhead. In certain embodiments, interrupts of a group of volumes may be grouped together to generate a single interrupt for the group.

Control starts at block 402, and from block 402, control may proceed to block 404 and 406 in parallel. At block 404, a determination is made as to whether the freeze is to be performed during synchronous peer to peer remote copy operations (the freeze referred to in block 404 may be initiated in response to a peer to peer remote copy suspension event). If so, control proceeds to block 410 in which at predetermined intervals of time a plurality of interrupts corresponding to the freeze are grouped into a single interrupt to reduce a total number of interrupts, and the process stops (at block 412). If not, control proceeds to block 412 where the process stops.

At block 406, a determination is made as to whether the freeze is to be performed to replace usage of the primary storage controller 104 with the secondary storage controller 106 (the freeze referred to in block 406 may be necessitated because a swap of the primary storage controller 104 with the secondary storage controller 106 is initiated as a result of a failure, such as a disk failure event, in the primary storage controller 104). If so, control proceeds to block 410 in which at predetermined intervals of time a plurality of interrupts corresponding to the freeze are grouped into a single interrupt to reduce a total number of interrupts, and the process stops (at block 412). If not, control proceeds to block 412 where the process stops.

Therefore, FIG. 4 illustrates certain embodiments in which interrupts that may be generated in a predetermined interval of time are grouped into fewer interrupts to improve system performance. For example, all interrupts generated every five seconds may be grouped and a group interrupt may be issued every five seconds.

FIGS. 1-4 illustrate certain embodiments in which a primary storage controller that is aware of the primary and secondary storage controller swapping capabilities of the host may warn the host of impending problems, so as to allow the host an opportunity to determine whether it is more effective to swap the primary and the secondary storage controllers or whether to wait for the primary storage controller to complete error recovery. In certain embodiments, to improve the system, instead of generating an interrupt corresponding to each volume or volume-pair during freezing of each volume, a plurality of potential interrupts are grouped together at predetermined intervals of time to generate a single interrupt.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
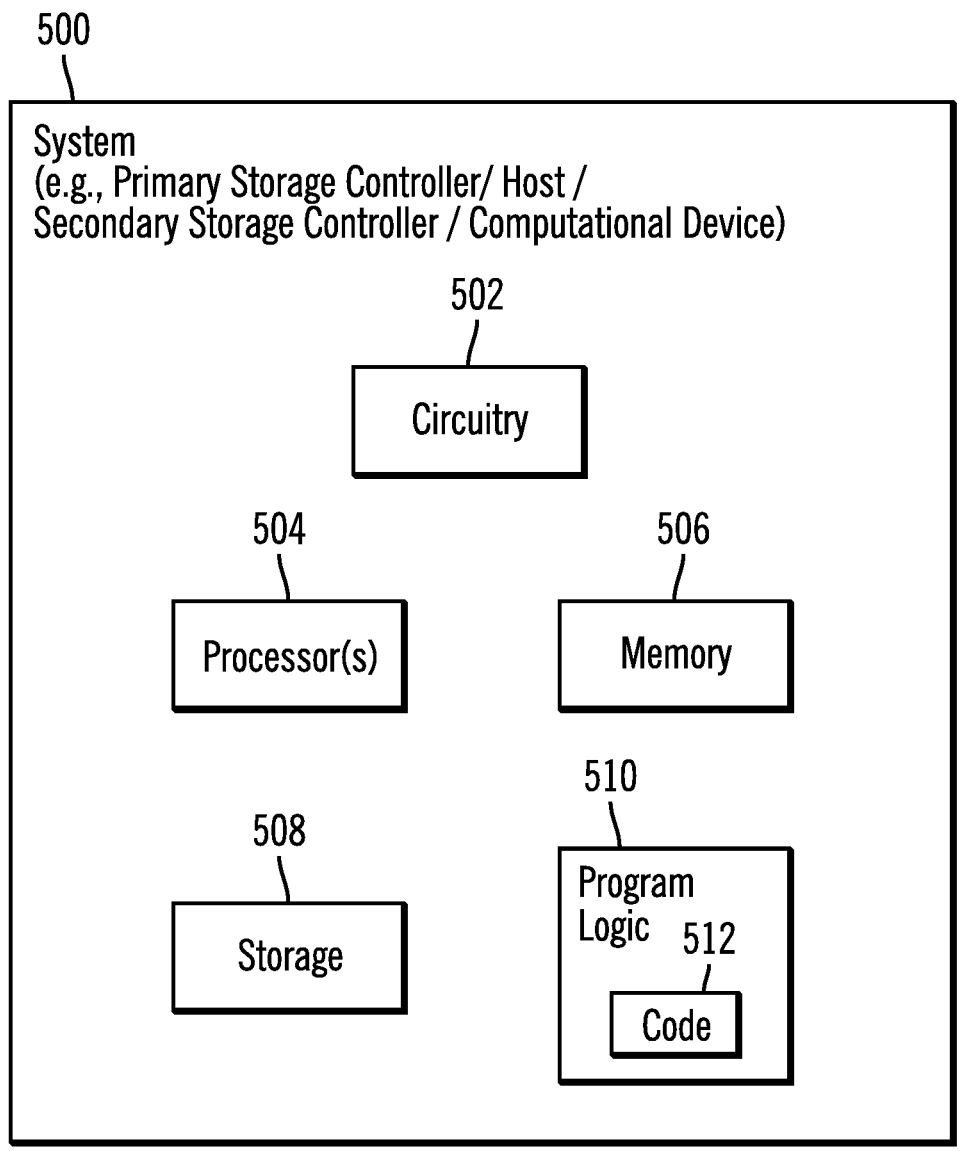
FIG. 5 illustrates a block diagram of a computational system that shows certain elements that may be included in at least the primary storage controller or host of FIG. 1, in accordance with certain embodiments.

FIG. 5 illustrates a block diagram that shows certain elements that may be included in the primary storage controller 104. the secondary storage controller 106, and the host 102, in accordance with certain embodiments. The system 500 may comprise the primary storage controller 104, the secondary storage controller 106, and the host 102, and may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a primary storage controller in a copy relationship with a secondary storage controller, wherein the primary and secondary storage controllers are coupled to a host that is configurable to use the secondary storage controller instead of the primary storage controller;
   determining, by the primary storage controller, occurrence of at least one condition in the primary storage controller, wherein the at least one condition occurs prior to a failure of the host to perform an Input/Output (I/O) operation with respect to at least one storage volume of the primary storage controller, and wherein subsequent to the occurrence of the at least one condition but prior to the failure of the host to perform the I/O operation, the host performs other I/O operations with respect to the at least one storage volume of the primary storage controller; and
   communicating, by the primary storage controller, the occurrence of the at least one condition to the host to provide an indication of a possibility of potential error at a future point in time, wherein in response to the communicating the host is configured to determine whether to use the secondary storage controller instead of the primary storage controller based on the occurrence of the at least one condition, wherein the determining of the occurrence of the at least one condition and the communicating of the occurrence of the at least one condition to the host, are performed in response to the primary storage controller determining that the host has capability to substitute usage of the primary storage controller with usage of the secondary storage controller, wherein the communicating by the primary storage controller the occurrence of the at least one condition to the host provides an indication that requests a remedial action to an operator, and wherein the host determines whether it is more effective to use the secondary storage controller instead of the primary storage controller in comparison to waiting for the primary storage controller to complete error recovery subsequent to the occurrence of the at least one condition.

2. The method of claim 1, wherein the occurrence of the at least one condition is caused by a loss of storage redundancy in the primary storage controller.

3. The method of claim 1, wherein the occurrence of the at least one condition is caused by a performance degradation in the primary storage controller.

4. The method of claim 1, wherein the occurrence of the at least one condition is caused by errors exceeding a threshold in the primary storage controller.

5. The method of claim 4, wherein the occurrence of the at least one condition is caused by an acute error in the primary storage controller from which recovery is not possible in the primary storage controller.

6. The method of claim 1, the method further comprising:
grouping at predetermined intervals of time a plurality of interrupts generated by freezing of a plurality of storage volumes into a single interrupt to reduce a total number of interrupts.

7. The method of claim 1, the method further comprising:
receiving, by the primary storage controller, a request from the host for additional information regarding the occurrence of the at least one condition, in response to the communicating, by the primary storage controller, of the occurrence of the at least one condition to the host; and
sending, by the primary storage controller, the requested additional information, to the host, wherein in response to the host receiving the additional information, the host determines whether to use the secondary storage controller instead of the primary storage controller.

8. The method of claim 6, wherein:
the primary storage controller completes recovery while allowing the I/O operation to proceed by using the secondary storage controller.

9. A system, comprising:
a memory; and
a processor coupled to the memory, wherein the processor performs operations, the operations comprising:
maintaining a primary storage controller in a copy relationship with a secondary storage controller, wherein the primary and secondary storage controllers are coupled to a host that is configurable to use the secondary storage controller instead of the primary storage controller;
determining, by the primary storage controller, occurrence of at least one condition in the primary storage controller, wherein the at least one condition occurs prior to a failure of the host to perform an Input/Output (I/O) operation with respect to at least one storage volume of the primary storage controller, and wherein subsequent to the occurrence of the at least one condition but prior to the failure of the host to perform the I/O operation, the host performs other I/O operations with respect to the at least one storage volume of the primary storage controller; and
communicating, by the primary storage controller, the occurrence of the at least one condition to the host to provide an indication of a possibility of potential error at a future point in time, wherein in response to the communicating the host is configured to determine whether to use the secondary storage controller instead of the primary storage controller based on the occurrence of the at least one condition, wherein the determining of the occurrence of the at least one condition and the communicating of the occurrence of the at least one condition to the host, are performed in response to the primary storage controller determining that the host has capability to substitute usage of the primary storage controller with usage of the secondary storage controller, wherein the communicating by the primary storage controller the occurrence of the at least one condition to the host provides an indication that requests a remedial action to an operator, and wherein the host determines whether it is more effective to use the secondary storage controller instead of the primary storage controller in comparison to waiting for the primary storage controller to complete error recovery subsequent to the occurrence of the at least one condition.

10. The system of claim 9, wherein:
the occurrence of the at least one condition is caused by a loss of storage redundancy in the primary storage controller; and
the occurrence of the at least one condition is caused by a performance degradation in the primary storage controller.

11. The system of claim 9, wherein:
the occurrence of the at least one condition is caused by errors exceeding a threshold in the primary storage controller; and
the occurrence of the at least one condition is caused by an acute error in the primary storage controller from which recovery is not possible in the primary storage controller.

12. The system of claim 9, the operations further comprising:
grouping at predetermined intervals of time a plurality of interrupts generated by freezing of a plurality of storage volumes into a single interrupt to reduce a total number of interrupts.

13. The system of claim 9, the operations further comprising:
receiving, by the primary storage controller, a request from the host for additional information regarding the occurrence of the at least one condition, in response to the communicating, by the primary storage controller, of the occurrence of the at least one condition to the host; and
sending, by the primary storage controller, the requested additional information, to the host, wherein in response to the host receiving the additional information, the host determines whether to use the secondary storage controller instead of the primary storage controller.

14. A computer program product, the computer program product comprising a non-transitory computer readable storage medium having computer readable program code embodied therewith, the computer readable program code configured to perform operations, the operations comprising:
maintaining a primary storage controller in a copy relationship with a secondary storage controller, wherein the primary and secondary storage controllers are coupled to a host that is configurable to use the secondary storage controller instead of the primary storage controller;
determining, by the primary storage controller, occurrence of at least one condition in the primary storage controller, wherein the at least one condition occurs prior to a failure of the host to perform an Input/Output (I/O) operation with respect to at least one storage volume of the primary storage controller, and wherein subsequent to the occurrence of the at least one condition but prior to the failure of the host to perform the I/O operation, the host performs other I/O operations with respect to the at least one storage volume of the primary storage controller; and
communicating, by the primary storage controller, the occurrence of the at least one condition to the host to provide an indication of a possibility of potential error at a future point in time, wherein in response to the communicating the host is configured to determine whether to use the secondary storage controller instead of the primary storage controller based on the occurrence of the at least one condition, wherein the determining of the occurrence of the at least one condition and the communicating of the occurrence of the at least one condition to the host, are performed in response to the primary storage controller determining that the host has capability to substitute usage of the primary storage controller with usage of the secondary storage controller, wherein the communicating by the primary storage controller the occurrence of the at least one condition to the host provides an indication that requests a remedial action to an operator, and wherein the host determines whether it is more effective to use the secondary storage controller instead of the primary storage controller in comparison to waiting for the primary storage controller to complete error recovery subsequent to the occurrence of the at least one condition.

15. The computer program product of claim 14, wherein:
the occurrence of the at least one condition is caused by a loss of storage redundancy in the primary storage controller; and
the occurrence of the at least one condition is caused by a performance degradation in the primary storage controller.

16. The computer program product of claim 14, wherein:
the occurrence of the at least one condition is caused by errors exceeding a threshold in the primary storage controller; and
the occurrence of the at least one condition is caused by an acute error in the primary storage controller from which recovery is not possible in the primary storage controller.

17. The computer program product of claim 14, the operations further comprising:
grouping at predetermined intervals of time a plurality of interrupts generated by freezing of a plurality of storage volumes into a single interrupt to reduce a total number of interrupts.

18. The computer program product of claim 14, the operations further comprising:
receiving, by the primary storage controller, a request from the host for additional information regarding the occurrence of the at least one condition, in response to the communicating, by the primary storage controller, of the occurrence of the at least one condition to the host; and
sending, by the primary storage controller, the requested additional information, to the host, wherein in response to the host receiving the additional information, the host determines whether to use the secondary storage controller instead of the primary storage controller.

19. The system of claim 12, wherein:
the primary storage controller completes recovery while allowing the I/O operation to proceed by using the secondary storage controller.

20. The computer program product of claim 17, wherein:
the primary storage controller completes recovery while allowing the I/O operation to proceed by using the secondary storage controller.

* * * * *